US012065921B2

(12) United States Patent
Jutaily et al.

(10) Patent No.: US 12,065,921 B2
(45) Date of Patent: Aug. 20, 2024

(54) STANDALONE DEMULSIFIER TESTING FOR CRUDE OIL (71) Applicant: Saudi Arabian Oil Company, Dhahran (SA)

(72) Inventors: Sulaiman A. Jutaily, Khobar (SA); Murtala Ahmed Mohammed, Dhahran (SA); Salah A. Al-Mulhim, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 425 days.

(21) Appl. No.: 17/552,086

(22) Filed: Dec. 15, 2021

(65) Prior Publication Data
US 2023/0184076 A1 Jun. 15, 2023

(51) Int. Cl.
E21B 43/34 (2006.01)
B01D 17/04 (2006.01)
G01K 13/12 (2006.01)
G01L 9/00 (2006.01)
G01S 7/285 (2006.01)
G01S 13/76 (2006.01)

(52) U.S. Cl.
CPC ............ *E21B 43/34* (2013.01); *B01D 17/042* (2013.01); *G01K 13/12* (2013.01); *G01L 9/0091* (2013.01); *G01S 7/285* (2013.01); *G01S 13/76* (2013.01)

(58) Field of Classification Search
CPC ..... E21B 43/34; B01D 17/042; B01D 17/047; B01D 17/12; G01K 13/12; G01K 1/024; G01L 9/0091; G01S 7/285; G01S 13/76; G01S 13/88; G01F 23/284; G01F 23/804
See application file for complete search history.

(56) References Cited

U.S. PATENT DOCUMENTS

| 5,612,490 A | 3/1997 | Carlson et al. |
| 9,658,178 B2 | 5/2017 | Surman et al. |
| 10,350,515 B2 | 7/2019 | Al-Shafei et al. |
| 10,472,576 B2 | 11/2019 | Salu et al. |

(Continued)

FOREIGN PATENT DOCUMENTS

| EP | 1377653 | 5/2008 |
| WO | WO1999023469 | 5/1999 |

OTHER PUBLICATIONS

Acosta et al., "Demulsification of Colombian Heavy Crude Oil (W/O) Emulsions: Insights into the Instability Mechanisms, Chemical Structure, and Performance of Different Commercial Demulsifiers," Energy Fuels, 2020, 34: 5665-5678, 14 pages.

(Continued)

*Primary Examiner* — Tarun Sinha
(74) *Attorney, Agent, or Firm* — Fish & Richardson P.C.

(57) ABSTRACT

An apparatus includes a vessel configured to be pressurized and heated at a well site to match desired process conditions at which a demulsifier is to break an emulsion of crude oil. The vessel includes a first end, a second end, an inlet pipe, and an outlet pipe. The inlet pipe receives crude oil and a demulsifier and mixes the crude oil and the demulsifier to form a mixture. The apparatus includes a heater surrounding at least a portion of the vessel. The heater is configured to provide heat to the mixture. The apparatus includes a guided wave radar configured to generate a reference pulse of microwave energy and detect a surface echo reflected from the mixture.

20 Claims, 5 Drawing Sheets (56) References Cited

U.S. PATENT DOCUMENTS

| | | |
|---|---|---|
| 10,578,568 B2 | 3/2020 | Saidian et al. |
| 10,794,865 B2 | 10/2020 | Sinha et al. |
| 10,808,183 B2 * | 10/2020 | Schabron ............. C10G 25/003 |
| 2015/0361350 A1 | 12/2015 | Prasad et al. |
| 2019/0063203 A1 * | 2/2019 | Arefjord ................ E21B 43/34 |

OTHER PUBLICATIONS

Feitosa et al., "Synthesis and application of additives based on cardanol as demulsifier for water-in-oil emulsions," Fuel, Feb. 2019, 245: 21-28.

Hajivand et al., '2. "Optimization of demulsifier formulation for separation of water from crude oil emulsions," Brazilian Journal of Chemical Engineering, Jan.-Mar. 2015, 32(01): 107-118, 12 pages.

Sjöblom et al., "Demulsifiers in the Oil Industry," Marcel Dekker, Inc., 2001, 25 pages.

* cited by examiner

STANDALONE DEMULSIFIER TESTING FOR CRUDE OIL

TECHNICAL FIELD

This disclosure relates to testing of demulsifiers for crude oil.

BACKGROUND

Water occurs naturally in oil and gas wells and reservoirs, for example, from an underlying aquifer or from injector wells, and can mix with and be extracted with the produced hydrocarbons. Co-extraction of water along with mineral hydrocarbons requires expensive separation, treatment, and disposal, which in many cases involves re-injection back into the well. Water cut is the ratio of the quantity of water produced to the total quantity of fluids produced from the production well. As hydrocarbons are depleted from a reservoir, the decrease in reservoir pressure allows for increased water migration into the rock formations, resulting in an increase in water cuts over time. Gas oil separation processes separate produced fluid into gas, oil, and aqueous phases. In some cases, produced water (aqueous phase) is injected back into the subterranean formation, is used in hydraulic fracturing, or is treated and disposed.

SUMMARY

This disclosure describes technologies relating to testing of demulsifiers of crude oil. Certain aspects of the subject matter described can be implemented as an apparatus for testing a demulsifier of crude oil. The apparatus includes a vessel, a heater, and a guided wave radar. The vessel is configured to be pressurized and heated at a well site to match desired process conditions at which the demulsifier is to break an emulsion of crude oil. The vessel includes a first end, a second end, an inlet pipe, an outlet pipe, a first port, and a second port. The second end is configured to mount on a stand. The inlet pipe includes a first inlet, a second inlet, and an outlet. The first inlet is configured to receive the crude oil. The second inlet is configured to receive the demulsifier. The inlet pipe is configured to mix the crude oil and the demulsifier to form a mixture of the crude oil and the demulsifier. The outlet is configured to discharge the mixture to an internal cavity defined by the vessel. The outlet pipe is configured to discharge the mixture from the vessel. The first port is configured to couple to a pressure transmitter. The second port is configured to couple to a temperature transmitter. The heater surrounds at least a portion of the vessel. The heater is configured to provide heat to the mixture within the internal cavity defined by the vessel. The guided wave radar is coupled to the first end of the vessel. The guided wave radar is configured to generate a reference pulse of microwave energy. The guided wave radar is configured to detect a surface echo reflected from the mixture within the internal cavity defined by the vessel.

This, and other aspects, can include one or more of the following features. The guided wave radar can include a probe that extends from the first end of the vessel and into the internal cavity defined by the vessel. The probe can be configured to guide the reference pulse of microwave energy to the mixture within the internal cavity defined by the vessel. In some implementations, the inlet pipe protrudes from an exterior of the vessel and is shaped, such that a mixing point for the crude oil and the demulsifier within the inlet pipe is exterior to the vessel. The heater can include an electric coil that is configured to connect to a power source. The electric coil can be configured to generate heat in response to receiving power from the power source. In some implementations, the inlet pipe is closer in proximity to the first end of the vessel in comparison to the outlet pipe. In some implementations, the first port is located intermediate of the first end of the vessel and the inlet pipe. In some implementations, the second port is located intermediate of the inlet pipe and the outlet pipe.

Certain aspects of the subject matter described can be implemented as a system for testing a demulsifier of crude oil. The system includes a vessel, an electric coil, a guided wave radar, a stand, a pressure transmitter, and a temperature transmitter. The vessel is configured to be pressurized and heated at a well site to match desired process conditions at which the demulsifier is to break an emulsion of the crude oil. The vessel includes a first end, a second end, an inlet pipe, an outlet pipe, a first port, and a second port. The inlet pipe includes a first inlet, a second inlet, and an outlet. The first inlet is configured to receive the crude oil. The second inlet is configured to receive the demulsifier. The inlet pipe is configured to mix the crude oil and the demulsifier to form a mixture of the crude oil and the demulsifier. The outlet is configured to discharge the mixture to an internal cavity defined by the vessel. The outlet pipe is configured to discharge the mixture from the vessel. The electric coil surrounds at least a portion of the vessel. The electric coil is configured to connect to a power source. The electric coil is configured to, in response to receiving power from the power source, generate heat to provide to the mixture within the internal cavity defined by the vessel. The guided wave radar is coupled to the first end of the vessel. The guided wave radar includes a probe that extends from the first end of the vessel and into the internal cavity defined by the vessel. The guided wave radar is configured to generate a reference pulse of microwave energy through the probe. The probe can be configured to guide the reference pulse of microwave energy to the mixture within the internal cavity defined by the vessel. The guided wave radar is configured to detect a surface echo reflected from the mixture within the internal cavity defined by the vessel. The stand is configured to support the vessel at its second end. The pressure transmitter is coupled to the first port. The pressure transmitter is configured to measure a pressure within the internal cavity defined by the vessel. The pressure transmitter is configured to transmit the measured pressure as a pressure signal. The temperature transmitter is coupled to the second port. The temperature transmitter is configured to measure a temperature within the internal cavity defined by the vessel. The temperature transmitter is configured to transmit the measured temperature as a temperature signal.

This, and other aspects, can include one or more of the following features. The system can include a computer. In some implementations, the computer is communicatively coupled to the guided wave radar, the pressure transmitter, and the temperature transmitter. The computer can include a processor and a computer-readable storage medium that is coupled to the processor. The storage medium can store programming instructions for execution by the processor. The programming instructions can instruct the processor to perform operations. The operations can include transmitting a microwave signal to the guided wave radar to generate the reference pulse of microwave energy through the probe. The operations can include receiving a surface echo signal from the guided wave radar. The operations can include receiving the pressure signal from the pressure transmitter. The operations can include receiving the temperature signal from the temperature transmitter. In some implementations, the power source is connected to the electric coil. In some implementations, the computer is communicatively coupled to the power source. The operations can include comparing the measured temperature of the temperature signal received from the temperature transmitter to a desired temperature. The operations can include transmitting a power signal to the power source in response to determining that the measured temperature does not match the desired temperature to adjust the power provided by the power source to the electric coil, thereby adjusting the heat generated by the electric coil. In some implementations, the inlet pipe is closer in proximity to the first end of the vessel in comparison to the outlet pipe. In some implementations, the first port is located intermediate of the first end of the vessel and the inlet pipe. In some implementations, the second port is located intermediate of the inlet pipe and the outlet pipe. The first inlet can be connected to a crude oil production header of a well. The first inlet can be connected to a pressurized crude oil sample vessel.

Certain aspects of the subject matter described can be implemented as a method for testing a demulsifier of crude oil. A first inlet of an inlet pipe receives crude oil. A second inlet of the inlet pipe receives a demulsifier. The inlet pipe mixes the crude oil and the demulsifier to form a mixture of the crude oil and the demulsifier. An outlet of the inlet pipe discharges the mixture to an internal cavity defined by a vessel. The vessel is positioned at a well site. The vessel includes a first end, a second end, the inlet pipe, an outlet pipe, a first port, and a second port. A heater heats the mixture within the internal cavity defined by the vessel. The heater surrounds at least a portion of the vessel. A guided wave radar generates a reference pulse of microwave energy. The guided wave radar is coupled to the first end of the vessel. A probe of the guided wave radar guides the reference pulse of microwave energy to the mixture within the internal cavity defined by the vessel. The probe extends from the first end of the vessel and into the internal cavity defined by the vessel. The guided wave radar detects a surface echo reflected from the mixture within the internal cavity defined by the vessel. A pressure transmitter measures a pressure within the internal cavity defined by the vessel. The pressure transmitter is coupled to the first port. A temperature transmitter measures a temperature within the internal cavity defined by the vessel. The temperature transmitter is coupled to the second port. The outlet pipe discharges the mixture from the vessel.

This, and other aspects, can include one or more of the following features. In some implementations, a computer is communicatively coupled to the guided wave radar, the pressure transmitter, and the temperature transmitter. The computer can include a processor and a computer-readable storage medium that is coupled to the processor. The processor can transmit a microwave signal to the guided wave radar to generate the reference pulse of microwave energy. The guided wave radar can transmit the surface echo as a surface echo signal to the processor. The processor can receive the surface echo signal from the guided wave radar. The processor can receive a pressure signal from the pressure transmitter, in which the pressure signal corresponds to the pressure measured by the pressure transmitter. The processor can receive a temperature signal from the temperature transmitter, in which the temperature signal corresponds to the temperature measured by the temperature transmitter. The heater can include an electric coil that is connected to a power source. Providing heat to the mixture within the internal cavity defined by the vessel can include providing, by the power source, power to the electric coil. Providing heat to the mixture within the internal cavity defined by the vessel can include generating, by the electric coil, heat in response to receiving power from the power source. In some implementations, the computer is communicatively coupled to the power source. The processor can compare the measured temperature of the temperature signal received from the temperature transmitter to a desired temperature. The processor can transmit a power signal to the power source in response to determining that the measured temperature does not match the desired temperature to adjust the power provided by the power source to the electric coil, thereby adjusting the heat generated by the electric coil.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes testing of demulsifiers of crude oil. Wet crude is an emulsion of oil (hydrocarbons) and water. Wet crude can be flowed to a gas oil separation unit where phases of the wet crude are separated to produce a dry crude oil product. A standalone apparatus can be used, for example, at a well site, to test the ability of a demulsifier to break an emulsion of crude oil. The apparatus includes a vessel, a heater, and a guided wave radar. The vessel can be pressurized, and the heater can provide heat, such that the crude oil along with the demulsifier being tested can be at the process conditions at which the demulsifier will be used. The guided wave radar is used to test the emulsion breaking ability of the demulsifier.

The subject matter described in this disclosure can be implemented in particular implementations, so as to realize one or more of the following advantages. The apparatuses, systems, and methods described can be implemented to efficiently test demulsifiers for their emulsion breaking capabilities. The emulsion breaking capabilities of demulsifiers can also be accurately predicted because the apparatuses, systems, and methods described can mimic the process conditions at which the demulsifier will be used. By implementing the described apparatuses, systems, and methods, an appropriate demulsifier can be selected, which can improve dry crude oil product quality, improve efficiency of gas oil separation processes, and reduce the use of excess demulsifier. Thus, implementation of the described apparatuses, systems, and methods can also result in reduced costs, thereby improving the bottom line of the operator. The apparatuses, systems, and methods described can, for example, be implemented at gas oil separation plants (GOSPs) to test the emulsion breaking capabilities of a demulsifier.

Figure 1A:
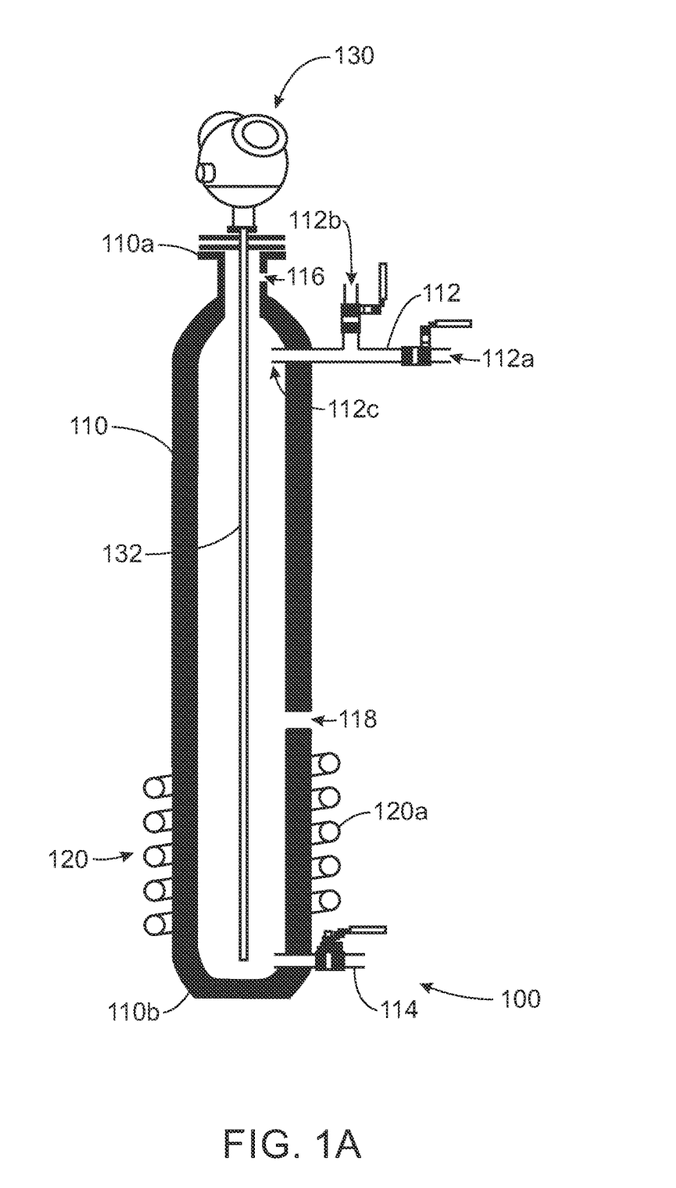
FIG. 1A is a schematic diagram of an example apparatus for testing a demulsifier of crude oil.

FIG. 1A is a schematic diagram of an example apparatus 100 for testing a demulsifier of crude oil at a well site. The apparatus 100 can be used at a well site to test an emulsion breaking efficiency of the demulsifier to determine its applicability in a well to enhance production from the well. The apparatus 100 includes a vessel 110, a heater 120, and a guided wave radar 130. The vessel 110 is configured to be pressurized and heated at the well site to match desired process conditions at which a demulsifier (being tested) is to break an emulsion of the crude oil. The vessel 110 includes a first end 110a and a second end 110b. The first end 110a is opposite the second end 110b. The second end 110b is configured to mount on a stand (shown in FIG. 1B).

The vessel 110 includes an inlet pipe 112. The inlet pipe 112 includes a first inlet 112a and a second inlet 112b. The first inlet 112a is configured to receive the crude oil. The second inlet 112b is configured to receive the demulsifier. The inlet pipe 112 is configured to mix the crude oil and the demulsifier to form a mixture of the crude oil and the demulsifier. In some implementations, the inlet pipe 112 protrudes from an exterior of the vessel 110. In some implementations, the inlet pipe 112 is shaped, such that a mixing point for the crude oil and the demulsifier within the inlet pipe 112 is exterior to the vessel 110. In some implementations, a distance between the mixing point for the crude oil and the demulsifier within the inlet pipe 112 and the exterior of the vessel 110 is in a range of from about 1 inch to about 12 inches. The inlet pipe 112 includes an outlet 112c that is configured to discharge the mixture to an internal cavity defined by the vessel 110. The vessel 110 includes an outlet pipe 114 that is configured to discharge the mixture from the vessel 110.

In some implementations, the inlet pipe 112 is closer in proximity to the first end 110a of the vessel 110 in comparison to the outlet pipe 114. For example, the inlet pipe 112 is located near the first end 110a, and the outlet pipe 114 is located near the second end 110b. Once the mixture of the crude oil and the demulsifier has flowed from the inlet pipe 112 and into the internal cavity defined by the vessel 110, the mixture can settle near the second end 110b of the vessel 110 via gravity. The vessel 110 includes a first port 116 that is configured to couple to a pressure transmitter. In some implementations, the first port 116 is located near the first end 110a, such that the pressure measured by the pressure transmitter coupled to the first port 116 is measured in the vapor space of the internal cavity defined by the vessel 110. In some implementations, the first port 116 is located intermediate of the first end 110a of the vessel 110 and the inlet pipe 112. The vessel 110 includes a second port 118 that is configured to couple to a temperature transmitter. In some implementations, the second port 118 is closer in proximity to the second end 110b of the vessel 110 in comparison to the first port 116. For example, the second port 118 is located, such that the temperature measured by the temperature transmitter coupled to the second port 118 is measured below a liquid level of the mixture of the crude oil and the demulsifier within the internal cavity defined by the vessel 110. In some implementations, the second port 118 is located intermediate of the inlet pipe 112 and the outlet pipe 114.

The heater 120 surrounds at least a portion of the vessel 110. The heater 120 is configured to provide heat to the mixture within the internal cavity defined by the vessel 110. The heater 120 can be used to adjust the temperature of the mixture within the internal cavity defined by the vessel 110 to match conditions in which the demulsifier will be performing its emulsion breaking function. In some implementations, the heater 120 is configured to provide heat at an adjustable rate to the mixture within the internal cavity defined by the vessel 110, such that the temperature of the mixture within the internal cavity defined by the vessel 110 is maintained at a desired temperature throughout testing of the demulsifier. In some implementations, the heater 120 is configured to provide heat at an adjustable rate to the mixture within the internal cavity defined by the vessel 110, such that the temperature of the mixture within the internal cavity defined by the vessel 110 is maintained within 50 degrees Fahrenheit (° F.) differential, within 40° F. differential, within 30° F. differential, within 20° F. differential, within 10° F. differential, or within 5° F. differential of a desired temperature throughout testing of the demulsifier. For example, for a desired temperature of 120° F., the heater 120 can provide heat at an adjustable rate to the mixture within the internal cavity defined by the vessel 110, such that the temperature of the mixture within the internal cavity defined by the vessel 110 is maintained within a temperature range of from 70° F. to 170° F., a temperature range of from 80° F. to 160° F., a temperature range of from 90° F. to 150° F., a temperature range of from 100° F. to 140° F., a temperature range of from 110° F. to 130° F., or a temperature range of from 115° F. to 125° F. In some implementations, the heater 120 provides heat at an adjustable rate to the mixture within the internal cavity defined by the vessel 110, such that the temperature of the mixture within the internal cavity defined by the vessel 110 is maintained within a temperature range of from 75° F. to 170° F. In some implementations, the heater 120 includes an electric coil 120a that is configured to connect to a power source. The electric coil 120a can be configured to generate heat in response to receiving power from the power source. In some implementations, the heater 120 includes a heating jacket (not shown). A heating fluid (for example, steam or hot oil) can circulate through the heating jacket to provide heat to the mixture within the internal cavity defined by the vessel 110.

The guided wave radar 130 can include a probe 132 that extends from the first end 110a and into the internal cavity defined by the vessel 110. The guided wave radar 130 is configured to generate a reference pulse of microwave energy through the probe 132. The probe 132 can be configured to guide the reference pulse of microwave energy to the mixture within the internal cavity defined by the vessel 110. The guided wave radar 130 is configured to detect a surface echo reflected from the mixture within the internal cavity defined by the vessel 110. The surface echo can be reflected, for example, from an oil phase of the mixture within the internal cavity defined by the vessel 110 once the demulsifier has broken the emulsion of the crude oil and the oil and water phases have separated. The surface echo can be reflected, for example, from an oil-water interface of the mixture within the internal cavity defined by the vessel 110 once the demulsifier has broken the emulsion of the crude oil and the oil and water phases have separated.

Figure 1B:
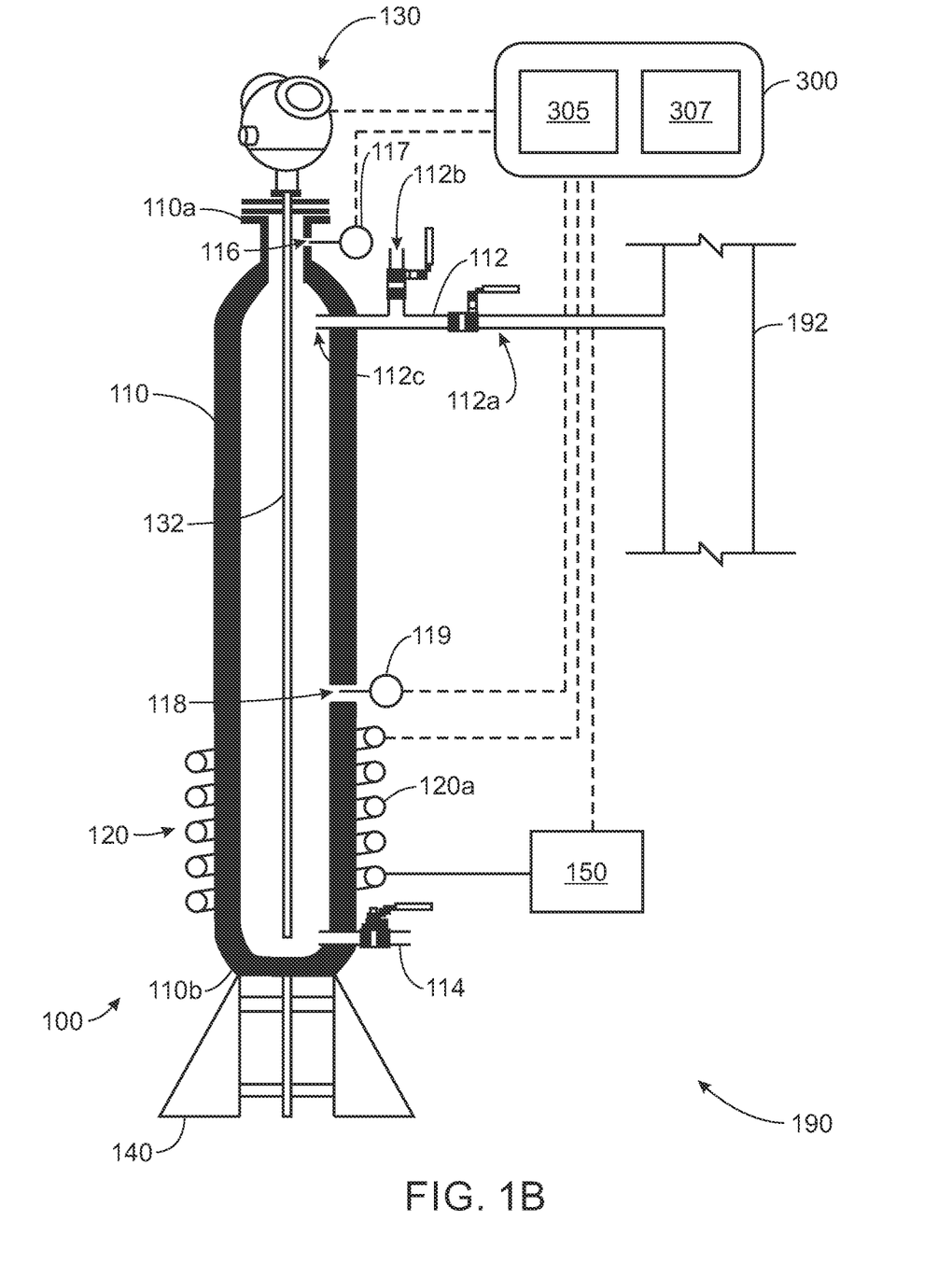
FIG. 1B is a schematic diagram of an example system for testing a demulsifier of crude oil, including the apparatus of FIG. 1A.

FIG. 1B is a schematic diagram of an example system 190 for testing a demulsifier of crude oil. The system 190 can be used at a well site to test an emulsion breaking efficiency of the demulsifier to determine its applicability in a well to enhance production from the well. The system 190 includes the apparatus 100, a stand 140, a pressure transmitter 117, and a temperature transmitter 119. The stand 140 is configured to support the vessel 110 at its second end 110b. The pressure transmitter 117 is coupled to the first port 116 and is configured to measure a pressure within the internal cavity defined by the vessel 110. The pressure transmitter 117 is configured to transmit the measured pressure as a pressure signal. The temperature transmitter 119 is coupled to the second port 118 and is configured to measure a temperature within the internal cavity defined by the vessel 110. The temperature transmitter 119 is configured to transmit the measured temperature as a temperature signal. While termed "transmitter", the transmitter can be optionally be replaced by a transducer (for example, a pressure transducer) and perform similar functions.

Figure 3:
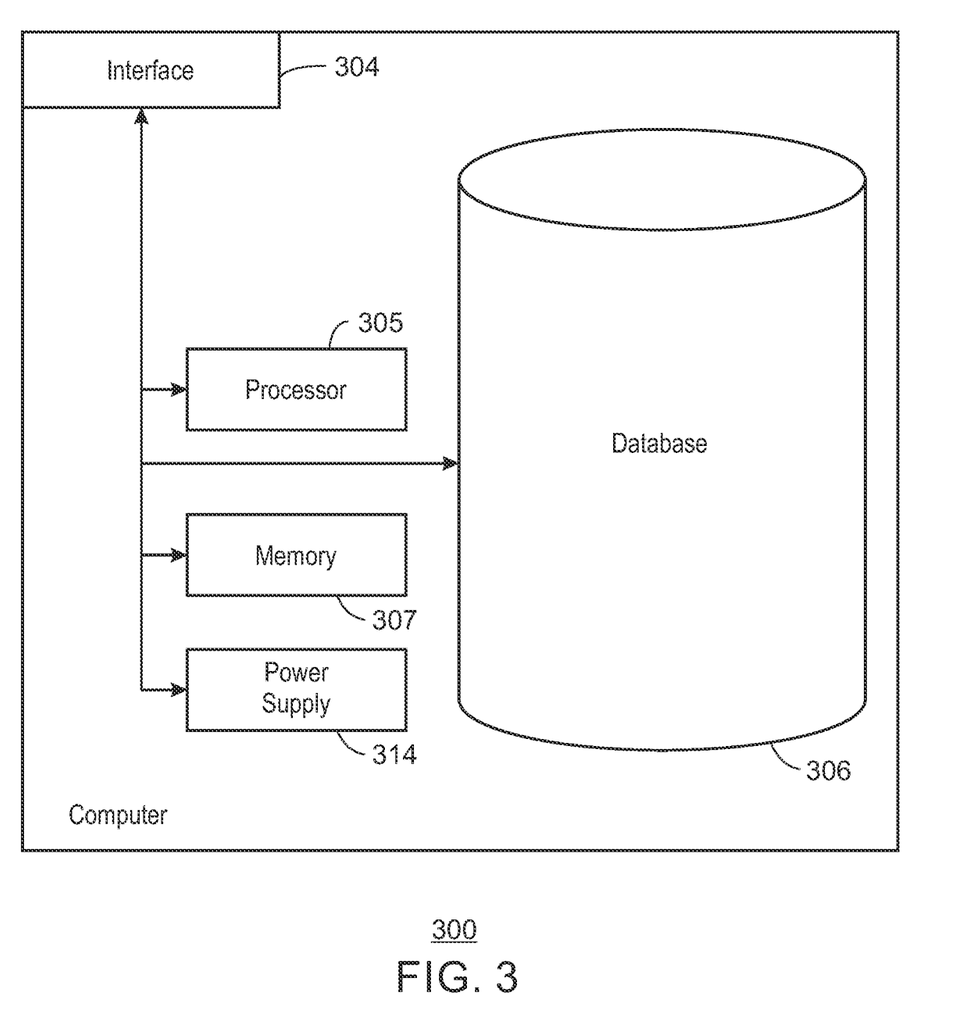
FIG. 3 is a block diagram of an example computer system that can be implemented with the apparatus of FIG. 1A.

In some implementations, the system 190 includes a computer 300 that is communicatively coupled to the guided wave radar 130, the pressure transmitter 117, and the temperature transmitter 119. The computer 300 includes a processor 305 and a memory 307. The memory 307 is coupled to the processor 305 and stores instructions that instruct the processor to perform various operations. The processor 305 can transmit a microwave signal to the guided wave radar 130 to generate the reference pulse of microwave energy through the probe 132. The processor 305 can receive a surface echo signal from the guided wave radar 130. The processor 305 can receive the pressure signal from the pressure transmitter 117. The processor 305 can receive the temperature signal from the temperature transmitter 119. Thus, the computer 300 can monitor the process conditions (pressure and temperature) within the internal cavity defined by the vessel 110. The computer 300 can process the received data (for example, the pressure data, the temperature data, and the surface echo data) to determine the emulsion breaking capability of the demulsifier. For example, the computer 300 processes the surface echo data to determine a total liquid height of the mixture within the internal cavity defined by the vessel 110, which corresponds to the combined liquid height of the separated oil and water phases. For example, the computer 300 processes the surface echo data to determine an interface height of the mixture within the internal cavity defined by the vessel 110, which corresponds to the height of the oil-water interface between the separated oil and water phases. The heights (total liquid height and interface height) can then be correlated to volumes of the separated oil and water phases, for example, based on calibration data. The computer 300 is also shown in FIG. 3 and described in more detail later.

In some implementations, the processor 305 can control the heat generated by the heater 120. The processor 305 can compare the measured temperature (of the temperature signal received from the temperature transmitter) to a desired temperature. In some implementations, the processor 305 is communicatively coupled to the electric coil 120a. In response to determining that the measured temperature does not match the desired temperature, the processor 305 can transmit a heating signal to the electric coil 120a to adjust the heat generated by the electric coil 120a. In some implementations, the system 190 includes a power source 150 that is connected to the electric coil 120a. The computer 300 can be communicatively coupled to the power source 150. In response to determining that the measured temperature does not match the desired temperature, the processor 305 can transmit a power signal to the power source 150 to adjust the power provided by the power source 150 to the electric coil 120a, thereby adjusting the heat generated by the electric coil 120a. In implementations where the heater 120 includes a heating fluid circulating through a heating jacket, the computer 300 can be communicatively coupled to a circulating pump or control valve, and the processor 305 can transmit a flow control signal to the circulating pump or control valve to adjust the flow of the heating fluid through the heating jacket, thereby adjusting the heat provided by the heating jacket.

In some implementations, as shown in FIG. 1B, the first inlet 112a of the inlet pipe 112 is connected to a crude oil production header 192 of a well. The well enables access to subterranean zones of interest to allow recovery (that is, production) of fluids to the surface and, in some implementations, additionally or alternatively to allow fluids to be placed in the Earth. The well can be a gas well used in producing hydrocarbon gas (such as natural gas) or an oil well used in producing hydrocarbon liquid (such as crude oil). While termed "gas well" or "oil well", the well need not produce only dry gas or only hydrocarbon liquid, and may produce both liquid (for example, oil and non-hydrocarbon liquids, such as water) and gas and can therefore be multiphase in any ratio. The pressure of the crude oil from the production header 192 can be adjusted to match conditions in which the demulsifier will be performing its emulsion breaking function. For example, the pressure of the crude oil from the production header 192 can be increased (for example, by a pump) or decreased (for example, by a valve or orifice plate) prior to being flowed to the first inlet 112a of the inlet pipe 112. The inlet pipe 112, the vessel 110, and the outlet pipe 114 are designed to withstand pressures that are expected with the handling and processing of crude oil. For example, the inlet pipe 112, the vessel 110, and the outlet pipe 114 have a design pressure of 350 pounds per square inch gauge (psig).

Figure 1C:
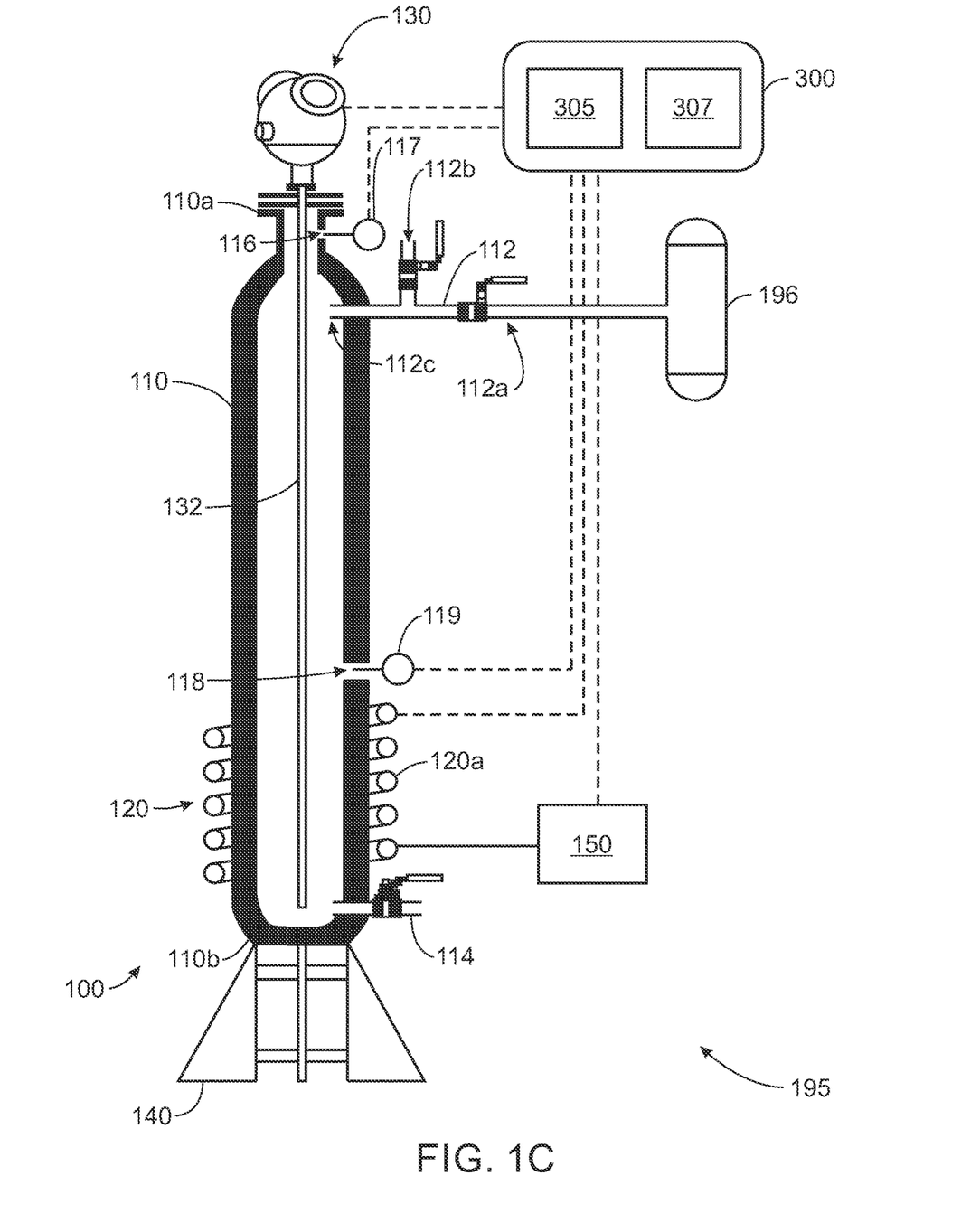
FIG. 1C is a schematic diagram of an example system for testing a demulsifier of crude oil, including the apparatus of FIG. 1A.

FIG. 1C is a schematic diagram of an example system 195 for testing a demulsifier of crude oil. The system 195 is substantially similar to the system 190 shown in FIG. 1B, but the first inlet 112a of the inlet pipe 112 is connected to a pressurized crude oil sample vessel 196. The pressurized crude oil sample vessel 196 can include a sample of pressurized crude oil obtained, for example, from the crude oil production header 192 of the well of FIG. 1B or from a sampling apparatus that obtained the sample from the well. The pressure of the crude oil from the pressurized crude oil sample vessel 196 can be adjusted to match conditions in which the demulsifier will be performing its emulsion breaking function. For example, the pressure of the crude oil from the sample vessel 196 can be increased (for example, by a pump) or decreased (for example, by a valve or orifice plate) prior to being flowed to the first inlet 112a of the inlet pipe 112.

Although shown in FIGS. 1B and 1C as being connected to the production header 192 and the sample vessel 196, respectively, the first inlet 112a of the inlet pipe 112 can be connected to other sources of crude oil. For example, the first inlet 112a of the inlet pipe 112 can be connected to a sampling point of a production trap (for example, a high pressure production trap or a low pressure production trap) in a gas oil separation plant. For example, the first inlet 112a of the inlet pipe 112 can be connected to a desalter in a gas oil separation plant. For example, the first inlet 112a of the inlet pipe 112 can be connected to a crude oil pipeline.

Figure 2:
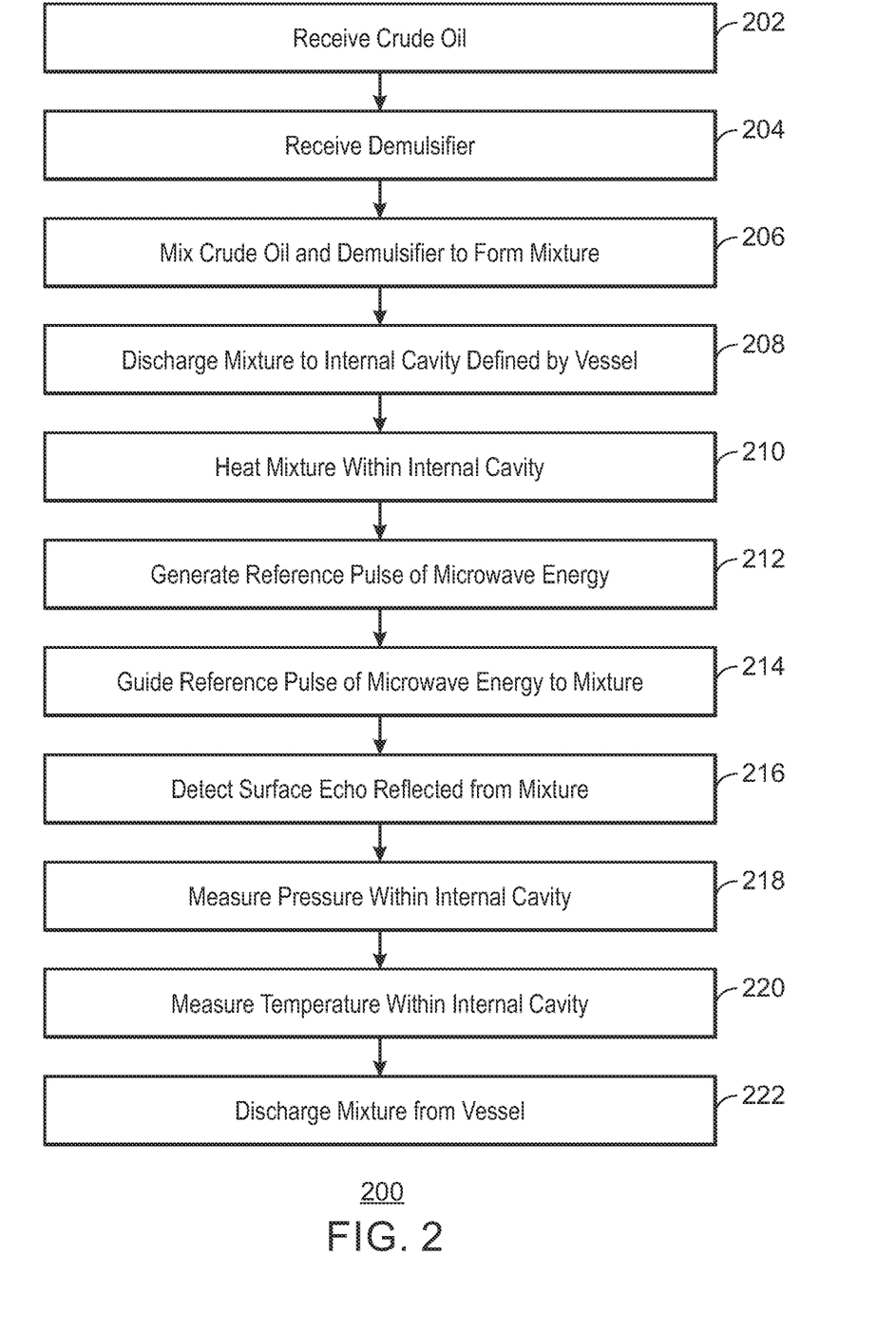
FIG. 2 is a flow chart of an example method for testing a demulsifier of crude oil.

FIG. 2 is a flow chart of an example method 200 for testing a demulsifier of crude oil. The method 200 can be implemented, for example, by the system 190 or the system 195. For simplicity and clarity, the method 200 is described in relation to the system 190, but the method 200 can also be implemented by the system 195 or another system that includes the apparatus 100. At block 202, a first inlet (such as the first inlet 112a) of an inlet pipe (such as the inlet pipe 112) receives crude oil. As described previously, the first inlet 112a can be connected to a crude oil production header 192 (FIG. 1B) or a pressurized crude oil sample vessel 196 (FIG. 1C). At block 204, a second inlet (such as the second inlet 112b) of the inlet pipe 112 receives a demulsifier. At block 206, the inlet pipe 112 mixes the crude oil and the demulsifier to form a mixture of the crude oil and the demulsifier. At block 208, an outlet (such as the outlet 112c) of the inlet pipe 112 discharges the mixture to an internal cavity defined by a vessel (such as the vessel 110). The vessel 110 is positioned at a well site. As described previously and shown in FIGS. 1A, 1B, and 1C, the vessel 110 includes the first end 110a, the second end 110b, the inlet pipe 112, the outlet pipe 114, the first port 116, and the second port 118.

In some implementations, the crude oil received by the first inlet 112a and the demulsifier received by the second inlet 112b flow into the internal cavity defined by the vessel 110 as a single batch. In some implementations, the crude oil received by the first inlet 112a and the demulsifier received by the second inlet 112b flow into the internal cavity defined by the vessel 110 continuously. In some implementations, the crude oil received by the first inlet 112a flows into the internal cavity defined by the vessel 110 continuously, while the demulsifier received by the second inlet 112b flows into the internal cavity defined by the vessel 110 as a single batch or intermittently. In some implementations, the crude oil received by the first inlet 112a flows into the internal cavity defined by the vessel 110 as a single batch, while the demulsifier received by the second inlet 112b flows into the internal cavity defined by the vessel 110 intermittently or continuously. In some implementations, the internal cavity defined by the vessel 110 is filled with the mixture, leaving no vapor space (which can mimic pipeline conditions). In some implementations, the internal cavity defined by the vessel 110 is only partially filled with the mixture, leaving some vapor space (which can mimic production traps that process and separate phases of crude oil).

At block 210, a heater (such as the heater 120) heats the mixture within the internal cavity defined by the vessel 110. The heater 120 heats the mixture at block 210 to a temperature that matches conditions in which the demulsifier will be performing its emulsion breaking function. In some implementations, the heater 120 provides heat at an adjustable rate to the mixture at block 210, such that the temperature of the mixture is maintained at a desired temperature or within 50° F. differential, within 40° F. differential, within 30° F. differential, within 20° F. differential, within 10° F. differential, or within 5° F. differential of the desired temperature throughout testing of the demulsifier. As described previously and shown in FIGS. 1A, 1B, and 1C, the heater 120 surrounds at least a portion of the vessel 110. In some implementations, as shown in FIGS. 1B and 1C, the electric coil 120a is connected to the power source 150, and the electric coil 120a generates heat in response to receiving power from the power source 150. The heat generated by the electric coil 120a can be used to heat the mixture within the internal cavity defined by the vessel 110 at block 210. In some implementations, a heating fluid is circulated through a heating jacket that surrounds at least a portion of the vessel 110. Heat from the heating fluid can be used to heat the mixture within the internal cavity defined by the vessel 110 at block 210.

At block 212, a guided wave radar (such as the guided wave radar 130) generates a reference pulse of microwave energy. As described previously and shown in FIGS. 1A, 1B, and 1C, the guided wave radar 130 is coupled to the first end 110a of the vessel 110 and includes a probe 132 that extends from the first end 110a and into the internal cavity defined by the vessel 110. At block 214, the probe 132 guides the reference pulse of microwave energy to the mixture within the internal cavity defined by the vessel 110. At block 216, the guided wave radar 130 detects a surface echo reflected from the mixture within the internal cavity defined by the vessel 110. The surface echo can be reflected, for example, from an oil phase of the mixture within the internal cavity defined by the vessel 110 once the demulsifier has broken the emulsion of the crude oil and the oil and water phases have separated. The surface echo can be reflected, for example, from an oil-water interface of the mixture within the internal cavity defined by the vessel 110 once the demulsifier has broken the emulsion of the crude oil and the oil and water phases have separated.

At block 218, a pressure transmitter (such as the pressure transmitter 117) measures a pressure within the internal cavity defined by the vessel 110. As described previously and shown in FIGS. 1B and 1C, the pressure transmitter 117 is coupled to the first port 116. The pressure transmitter 117 can, for example, measure a pressure in the vapor space of the internal cavity defined by the vessel 110 at block 218. At block 220, a temperature transmitter (such as the temperature transmitter 119) measures a temperature within the internal cavity defined by the vessel 110. As described previously and shown in FIGS. 1B and 1C, the temperature transmitter 119 is coupled to the second port 118. The temperature transmitter 119 can, for example, measure a temperature below a liquid level of the mixture within the internal cavity defined by the vessel 110 at block 220. At block 222, the outlet pipe 114 discharges the mixture from the vessel 110.

In some implementations, the computer 300 can be used to control various aspects of the method 200. For example, the processor 305 can control the heat generated by the heater 120 at block 210. The processor 305 can compare the measured temperature (of the temperature signal received from the temperature transmitter 119) to a desired temperature. In response to determining that the measured temperature does not match the desired temperature, the processor 305 can transmit a heating signal to the electric coil 120a to adjust the heat generated by the electric coil 120a or transmit a power signal to the power source 150 to adjust the power provided by the power source 150 to the electric coil 120a, thereby adjusting the heat generated by the electric coil 120a. In response to determining that the measured temperature does not match the desired temperature, the processor 305 can transmit a flow control signal to a circulating pump or control valve to adjust the flow of a heating fluid through a heating jacket, thereby adjusting the heat provided by the heating jacket. As another example, the processor 305 can control the pressure within the internal cavity defined by the vessel 110. The processor 305 can compare the measured pressure (of the pressure signal received from the pressure transmitter 117) to a desired pressure. In response to determining that the measured pressure does not match the desired pressure, the processor 305 can transmit a pressure control signal to a flow control device (for example, a pump or a valve) to adjust the pressure of the fluid (for example, the mixture of the crude oil and the demulsifier) that enters the vessel 110. As another example, the processor 305 can control the guided wave radar 130. The processor 305 can transmit a microwave signal to the guided wave radar 130 to generate the reference pulse of microwave energy through the probe 132. The processor 305 can receive the surface echo signal from the guided wave radar 130.

FIG. 3 is a block diagram of an example computer 300 used to provide computational functionalities associated with described algorithms, methods, functions, processes, flows, and procedures, as described in this specification, according to an implementation. The illustrated computer 300 is intended to encompass any computing device such as a server, desktop computer, laptop/notebook computer, one or more processors within these devices, or any other processing device, including physical or virtual instances (or both) of the computing device. Additionally, the computer 300 can include a computer that includes an input device, such as a keypad, keyboard, touch screen, or other device that can accept user information, and an output device that conveys information associated with the operation of the computer 300, including digital data, visual, audio information, or a combination of information.

The computer 300 includes an interface 304. Although illustrated as a single interface 304 in FIG. 3, two or more interfaces 304 may be used according to particular needs, desires, or particular implementations of the computer 300. Although not shown in FIG. 3, the computer 300 can be communicably coupled with a network. The interface 304 is used by the computer 300 for communicating with other systems that are connected to the network in a distributed environment. Generally, the interface 304 comprises logic encoded in software or hardware (or a combination of software and hardware) and is operable to communicate with the network. More specifically, the interface 304 may comprise software supporting one or more communication protocols associated with communications such that the network or interface's hardware is operable to communicate physical signals within and outside of the illustrated computer 300.

The computer 300 includes a processor 305. Although illustrated as a single processor 305 in FIG. 3, two or more processors may be used according to particular needs, desires, or particular implementations of the computer 300. Generally, the processor 305 executes instructions and manipulates data to perform the operations of the computer 300 and any algorithms, methods, functions, processes, flows, and procedures as described in this specification.

The computer 300 can also include a database 306 that can hold data for the computer 300 or other components (or a combination of both) that can be connected to the network. Although illustrated as a single database 306 in FIG. 3, two or more databases (of the same or combination of types) can be used according to particular needs, desires, or particular implementations of the computer 300 and the described functionality. While database 306 is illustrated as an integral component of the computer 300, database 306 can be external to the computer 300.

The computer 300 also includes a memory 307 that can hold data for the computer 300 or other components (or a combination of both) that can be connected to the network. Although illustrated as a single memory 307 in FIG. 3, two or more memories 307 (of the same or combination of types) can be used according to particular needs, desires, or particular implementations of the computer 300 and the described functionality. While memory 307 is illustrated as an integral component of the computer 300, memory 307 can be external to the computer 300. The memory 307 can be a transitory or non-transitory storage medium.

The memory 307 stores computer-readable instructions executable by the processor 305 that, when executed, cause the processor 305 to perform operations, such as transmitting a microwave signal to the guided wave radar 130, receiving a surface echo signal from the guided wave radar 130, receiving a pressure signal from the pressure transmitter 117, receiving a temperature signal from the temperature transmitter 119, or any of the computer-implemented blocks of method 200. The computer 300 can also include a power supply 314. The power supply 314 can include a rechargeable or non-rechargeable battery that can be configured to be either user- or non-user-replaceable. The power supply 314 can be hard-wired. There may be any number of computers 300 associated with, or external to, a computer system containing computer 300, each computer 300 communicating over the network. Further, the term "client," "user," "operator," and other appropriate terminology may be used interchangeably, as appropriate, without departing from this specification. Moreover, this specification contemplates that many users may use one computer 300, or that one user may use multiple computers 300.

EXAMPLE

An example implementation of the apparatus 100 had the following dimensions. The vessel 110 had a length of 24 inches (60.96 centimeters) and a radius of 1.5 inches (3.81 centimeters), resulting in an inner volume for its internal cavity of 2.78 liters (2,780 cubic centimeters). The first inlet 112a of the inlet pipe 112 (for crude oil) had a nominal pipe size of ¼ (DN 8). The second inlet 112b of the inlet pipe 112 (for demulsifier) had a nominal pipe size of ½ (DN 15). The outlet pipe 114 (for mixture) had a nominal pipe size of ¾ (DN 20).

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An apparatus for testing a demulsifier of crude oil, the apparatus comprising:
    a vessel configured to be pressurized and heated at a well site to match desired process conditions at which the demulsifier is to break an emulsion of the crude oil, the vessel comprising:
        a first end;
        a second end configured to mount on a stand;
        an inlet pipe comprising:
            a first inlet configured to receive the crude oil;
            a second inlet configured to receive the demulsifier, wherein the inlet pipe is configured to mix the crude oil and the demulsifier to form a mixture of the crude oil and the demulsifier; and
            an outlet configured to discharge the mixture to an internal cavity defined by the vessel;
        an outlet pipe configured to discharge the mixture from the vessel;
        a first port configured to couple to a pressure transmitter; and
        a second port configured to couple to a temperature transmitter;
    a heater surrounding at least a portion of the vessel, the heater configured to provide heat to the mixture within the internal cavity defined by the vessel; and
    a guided wave radar coupled to the first end of the vessel, wherein the guided wave radar is configured to generate a reference pulse of microwave energy and detect a surface echo reflected from the mixture within the internal cavity defined by the vessel.

2. The apparatus of claim 1, wherein the guided wave radar comprises a probe extending from the first end of the vessel and into the internal cavity defined by the vessel, and the probe is configured to guide the reference pulse of microwave energy to the mixture within the internal cavity defined by the vessel.

3. The apparatus of claim 2, wherein the inlet pipe protrudes from an exterior of the vessel and is shaped, such that a mixing point for the crude oil and the demulsifier within the inlet pipe is exterior to the vessel.

4. The apparatus of claim 3, wherein the heater comprises an electric coil configured to connect to a power source, and the electric coil is configured to generate heat in response to receiving power from the power source.

5. The apparatus of claim 4, wherein the inlet pipe is closer in proximity to the first end of the vessel in comparison to the outlet pipe.

6. The apparatus of claim 5, wherein the first port is located intermediate of the first end of the vessel and the inlet pipe.

7. The apparatus of claim 6, wherein the second port is located intermediate of the inlet pipe and the outlet pipe.

8. A system for testing a demulsifier of crude oil, the system comprising:
    a vessel configured to be pressurized and heated at a well site to match desired process conditions at which the demulsifier is to break an emulsion of the crude oil, the vessel comprising:
        a first end;
        a second end;
        an inlet pipe comprising:
            a first inlet configured to receive the crude oil;
            a second inlet configured to receive the demulsifier, wherein the inlet pipe is configured to mix the crude oil and the demulsifier to form a mixture of the crude oil and the demulsifier; and
            an outlet configured to discharge the mixture to an internal cavity defined by the vessel;
        an outlet pipe configured to discharge the mixture from the vessel;
        a first port; and
        a second port;
    an electric coil surrounding at least a portion of the vessel, the electric coil configured to connect to a power source and, in response to receiving power from the power source, generate heat to provide to the mixture within the internal cavity defined by the vessel;
    a guided wave radar coupled to the first end of the vessel, the guided wave radar comprising a probe extending from the first end of the vessel and into the internal cavity defined by the vessel, wherein the guided wave radar is configured to generate a reference pulse of microwave energy through the probe and detect a surface echo reflected from the mixture within the internal cavity defined by the vessel;
    a stand configured to support the vessel at its second end;
    a pressure transmitter coupled to the first port, the pressure transmitter configured to measure a pressure within the internal cavity defined by the vessel and transmit the measured pressure as a pressure signal; and
    a temperature transmitter coupled to the second port, the temperature transmitter configured to measure a temperature within the internal cavity defined by the vessel and transmit the measured temperature as a temperature signal.

9. The system of claim 8, comprising a computer communicatively coupled to the guided wave radar, the pressure transmitter, and the temperature transmitter, wherein the computer comprises:
- a processor; and
- a computer-readable storage medium coupled to the processor and storing programming instructions for execution by the processor, the programming instructions instructing the processor to perform operations comprising:
  - transmitting a microwave signal to the guided wave radar to generate the reference pulse of microwave energy through the probe;
  - receiving a surface echo signal from the guided wave radar;
  - receiving the pressure signal from the pressure transmitter; and
  - receiving the temperature signal from the temperature transmitter.

10. The system of claim 9, comprising the power source connected to the electric coil, wherein the computer is communicatively coupled to the power source, and the operations performed by the processor comprise:
- comparing the measured temperature of the temperature signal received from the temperature transmitter to a desired temperature;
- in response to determining that the measured temperature does not match the desired temperature, transmitting a power signal to the power source to adjust the power provided by the power source to the electric coil, thereby adjusting the heat generated by the electric coil.

11. The system of claim 9, wherein the inlet pipe protrudes from an exterior of the vessel and is shaped, such that a mixing point for the crude oil and the demulsifier within the inlet pipe is exterior to the vessel.

12. The system of claim 11, wherein the inlet pipe is closer in proximity to the first end of the vessel in comparison to the outlet pipe.

13. The system of claim 12, wherein the first port is located intermediate of the first end of the vessel and the inlet pipe.

14. The system of claim 13, wherein the second port is located intermediate of the inlet pipe and the outlet pipe.

15. The system of claim 14, wherein the first inlet is connected to a crude oil production header of a well.

16. The system of claim 14, wherein the first inlet is connected to a pressurized crude oil sample vessel.

17. A method for testing a demulsifier of crude oil, the method comprising:
- receiving, by a first inlet of an inlet pipe, crude oil;
- receiving, by a second inlet of the inlet pipe, a demulsifier;
- mixing, by the inlet pipe, the crude oil and the demulsifier to form a mixture of the crude oil and the demulsifier;
- discharging, by an outlet of the inlet pipe, the mixture to an internal cavity defined by a vessel, the vessel positioned at a well site and comprising a first end, a second end, the inlet pipe, an outlet pipe, a first port, and a second port;
- heating, by a heater surrounding at least a portion of the vessel, the mixture within the internal cavity defined by the vessel;
- generating, by a guided wave radar coupled to the first end of the vessel, a reference pulse of microwave energy;
- guiding, by a probe of the guided wave radar, the reference pulse of microwave energy to the mixture within the internal cavity defined by the vessel, the probe extending from the first end of the vessel and into the internal cavity defined by the vessel;
- detecting, by the guided wave radar, a surface echo reflected from the mixture within the internal cavity defined by the vessel;
- measuring, by a pressure transmitter coupled to the first port, a pressure within the internal cavity defined by the vessel;
- measuring, by a temperature transmitter coupled to the second port, a temperature within the internal cavity defined by the vessel; and
- discharging, by the outlet pipe, the mixture from the vessel.

18. The method of claim 17, wherein a computer is communicatively coupled to the guided wave radar, the pressure transmitter, and the temperature transmitter, the computer comprises a processor and a computer-readable storage medium coupled to the processor, and the method comprises:
- transmitting, by the processor, a microwave signal to the guided wave radar to generate the reference pulse of microwave energy;
- transmitting, by the guided wave radar, the surface echo as a surface echo signal to the processor;
- receiving, by the processor, the surface echo signal from the guided wave radar;
- receiving, by the processor, a pressure signal from the pressure transmitter, the pressure signal corresponding to the pressure measured by the pressure transmitter; and
- receiving, by the processor, a temperature signal from the temperature transmitter, the temperature signal corresponding to the temperature measured by the temperature transmitter.

19. The method of claim 18, wherein:
- the heater comprises an electric coil connected to a power source;
- providing heat to the mixture within the internal cavity defined by the vessel comprises:
  - providing, by the power source, power to the electric coil; and
  - generating, by the electric coil, heat in response to receiving power from the power source.

20. The method of claim 19, wherein the computer is communicatively coupled to the power source, and the method comprises:
- comparing, by the processor, the measured temperature of the temperature signal received from the temperature transmitter to a desired temperature; and
- in response to determining that the measured temperature does not match the desired temperature, transmitting a power signal to the power source to adjust the power provided by the power source to the electric coil, thereby adjusting the heat generated by the electric coil.

* * * * *